United States Patent [19]

Boyd et al.

[11] Patent Number: 5,128,899

[45] Date of Patent: Jul. 7, 1992

[54] METHOD FOR SHARPENING PRESTACK DEPTH MIGRATION IMAGES BY REMOVING RESIDUAL MOVEOUT FROM COMMON IMAGE POINT GATHERS BEFORE STACKING

[75] Inventors: Mark Boyd; Shein S. Wang; James M. Tippett; Douglas W. Hanson, all of Ponca City, Okla.

[73] Assignee: Conoco Inc., Ponca City, Okla.

[21] Appl. No.: 731,824

[22] Filed: Jul. 16, 1991

[51] Int. Cl.[5] .............................................. G01V 1/36
[52] U.S. Cl. ........................................ 367/50; 367/51; 367/52
[58] Field of Search ..................... 364/421; 367/50, 51, 367/52, 59

[56] References Cited

U.S. PATENT DOCUMENTS

| H482 | 7/1988 | Berryhill et al. | 367/38 |
|---|---|---|---|
| 4,206,509 | 6/1980 | Ruehle | 367/50 |
| 4,241,429 | 12/1980 | Bloomquist et al. | 367/52 |
| 4,736,347 | 4/1988 | Goldberg et al. | 367/46 |
| 4,745,585 | 5/1988 | Larner | 367/50 |
| 4,766,574 | 8/1988 | Whitmore, Jr. et al. | 367/50 |
| 4,802,146 | 1/1989 | Moeckel | 367/52 |
| 4,802,147 | 1/1989 | Moeckel | 367/57 |
| 4,813,027 | 3/1989 | Tieman | 367/52 |
| 4,964,103 | 10/1990 | Johnson | 367/53 |

Primary Examiner—Ian J. Lobo

[57] ABSTRACT

A method for removing residual moveout includes sorting the results of common offset depth migration into common image point gathers. A subset of image point gathers are selected for analysis. Each common image point gather is separated vertically into windows, each of which centers on a strong event. For each window, all the offset traces are summed to produce a brute stack trace to be used as an anchor. All offsets are cross-correlated to the anchor to determine how much each trace window should be shifted to sum most constructively with the anchor. A set of dynamic shifts is produced, which when applied, will remove the residual moveouts and produce a truly flat image for stacking. These shifts vary with depth and offset and can be interpolated between the selected image point gathers.

8 Claims, 2 Drawing Sheets

METHOD FOR SHARPENING PRESTACK DEPTH MIGRATION IMAGES BY REMOVING RESIDUAL MOVEOUT FROM COMMON IMAGE POINT GATHERS BEFORE STACKING

BACKGROUND OF THE INVENTION

1. Field of the Invention

The present invention pertains to methods for processing seismic data to remove errors occurring in common offset prestack depth migration images and more particularly to removing residual moveouts of a general nature from depth migrated data.

2. Related Prior Art

Prior art has disclosed many methods for processing seismic data. One of the most common procedures is Normal Moveout (NMO) correction applied to the time domain. A significant problem with NMO occurs when velocities change laterally. Even with improved techniques in the application of normal moveout correction, stacking along hyperbolic moveout curves are not always successful. These problems produce moveout which is not described by the normal moveout equation.

Prestack depth migration overcomes the problem of laterally varying velocities by broadcasting recorded reflection events along non-hyperbolic moveout curves which are computed from a velocity model. However, ordinary prestack depth migration images are not always sharp because one rarely has a perfect velocity model or perfect numerical migration. The present invention uses dynamic residual statics applied prestack to image traces in depth to produce a sharp image by removing the residual moveouts from each trace in each common image point gather due to these problems. Examples of processing methods which include migration and normal moveout correction are as follows.

United States Registration number H482 titled "Seismic Migration Method" (John R. Berryhill et al.) relates to a seismic data processing method in which seismic traces are subjected to Fourier transformations. The coefficients of the Fourier-Transformed traces are subjected to a recursive FK migration operation. The migrated traces are thereafter inverse-Fourier-transformed. Each trace contains a signal resulting from reflection of a seismic signal at a location within the earth, and each trace is associated with at least one point in a two-dimensional spatial grid (x,y). When displayed, the processed seismic data represents the position within the earth of whatever caused the reflection. The method may be employed to process stacked seismic traces, each associated with a single point (x,y) in the grid, or may be employed to process unstacked seismic traces, each associated with both a seismic source location $(x_s, y_s)$ and a different seismic receiver location $(x_r, y_r)$ in the grid. In performing the method, the earth is modeled as a stack of M horizontal layers, each characterized by a seismic wave velocity. The recursive FK migration step is iterated $M-1$ times for each trace, where part of the output of each iteration is stored and part discarded.

U.S. Pat. No. 4,802,147 titled "Method for Segregating and Stacking Vertical Seismic Profile Data in Common Reflection Point Bins" (Georqe P. Moeckel) relates to a method for segregating and stacking vertical seismic profile data. The offset difference between the well location and the position of the source is divided into equal segments. Vertical seismic profile moveout corrected data is placed in common reflection point bins and stacked.

U.S. Pat. No. 4,813,027 titled "Method and Apparatus for Enhancing Seismic Data" (Hans Tieman) relates to a method and apparatus for stacking a plurality of seismic midpoint gathers to provide a pictorial representation of seismic events. The approximate propagation velocity, corresponding to a selected event in a common midpoint gather, is determined by summing the common midpoint gather using first and second weights to provide respective first and second weighted sums over an offset based on an estimated velocity corresponding to the event. A velocity error value indicative of the approximate error between the estimated velocity and the actual velocity is developed from the sums. The common midpoint gather is then restacked in accordance with the determined propagation velocity to provide an enhanced pictorial representation of the seismic event. The first and second weighted sums are taken over a time window centered upon an estimated zero offset travel time for the event. The first and second weights can be selected to provide rapid, slow or intermediate convergence upon the true velocity. The velocity error value is determined as a function of the deviation of the peak of the first weighted sum from the center of the time window, relative to the deviation of the peak of the second weighted sum from the center of the time window. Alternatively, the velocity error value is determined as a function of the deviation of the peak of the cross-correlation of the first and second weighted sums from the center of the time window.

U.S. Pat. No. 4,241,429 titled "Velocity Determination and Stacking Process from Seismic Exploration of Three Dimensional Reflection Geometry" (Marvin G. Bloomquist et al) relates to a method for determining the dip and strike of subsurface interfaces and average propagation velocity of seismic waves. In seismic exploration, linear, multiple fold, common depth point sets of seismograms with three dimensional reflection geometry are used to determine the dip and strike of the subsurface reflecting interfaces and the average velocity of the path of the seismic energy to the reflecting interface. The reflections in each set appear with time differences on a hyperbola with trace spacings determined by the source receiver coordinate distance along the lines of exploration. The offset of the apex of this hyperbola is determined from a normal moveout velocity search of the type performed on two dimensional common depth point (CDP) sets. This search identifies the correct stacking velocity and hyperbola offset which are used to determine dip, strike and average velocity.

U.S. Pat. No. 4,766,574 titled "Method for Depth Imaging Multicomponent Seismic Data" (Norman D. Whitmore, Jr., et al.) relates generally to a method of geophysical exploration. This method may be used for imaging multicomponent seismic data to obtain depth images of the earth's subsurface geological structure as well as estimates of compressional and shear wave interval velocities. In particular, measures are obtained of imparted seismic wavefields incident on reflecting interfaces the earth's subsurface and of resulting seismic wavefields scattered therefrom. The incident and scattered seismic wavefields are employed to produce time-dependent reflectivity functions which are representative of the reflecting interfaces. By migrating the time-dependent reflectivity functions, better depth images of the reflecting interfaces can be obtained. For a dyadic set of multicomponent seismic data, the dyadic set is partitioned in order to separate the variously coupled incident and reflected wavefields in the recorded multi-component seismic data. The incident and reflected wavefields are cross-correlated to form reflectivity functions that are time-dependent. These time-dependent reflectivity functions are then iteratively migrated according to a model of wavefield velocities of propagation to obtain estimates of the compressional and shear wave interval velocity. The migrated reflectivity functions can then be stacked to produce depth images of the earth's subsurface geological structures.

U.S. Pat. No. 4,802,146 titled "Method for Moveout Correction and Stacking Velocity Estimation of Offset VSP Data" (George P. Moeckel) relates to a moveout correction process and stacking velocity estimation process to permit stacking of vertical seismic profile (VSP) data. The primary reflection time is determined by using the two-way travel time, the root mean square velocity of acoustic pulses in the formation and the first arrival time of direct path acoustic pulses.

U.S. Pat. No. 4,736,347 titled "Multiple Stacking and Spatial Mapping of Seismic Data" (Bernard Goldberg et al.) relates to a method for determining the dip of subsurface formations and the apparent acoustic velocity. Seismic traces are stacked in a plurality of orthogonal measures to form multiple stacked traces at a positive offset. The stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined. Seismic data corresponding to the second reflecting boundary are then mapped spatially to the first reflecting boundary by ray tracing and by calculating the apparent velocities at the first boundary. The process is repeated for each succeedingly deeper boundary. The derived acoustic velocity model of the earth is displayed as a stacked seismic section in spatial coordinates. This process may be applied to obtain earth models and seismic sections in both two and three dimensions.

A prior art method which has little connection with depth migration or moveout correction is contained in U.S. Pat. No. 4,745,585. This patent is of interest because it illustrates a method whereby seismic data migration may be broken down into distinct portions.

U.S. Pat. No. 4,745,585 "Method of Migrating Seismic Data" (Kenneth L. Larner) relates to a method for migrating seismic data in steps where each step is a portion of the total migration. Seismic data is passed through a preselected number of migration stages. During each stage, data is migrated a plurality of times, where the migration-velocity function is a minor fraction of the velocity required to fully migrate the data in a single stage. The cascaded migration is used to migrate data having steeply-dipping events.

SUMMARY OF THE INVENTION

The output of a common offset depth migration can be sorted into common image point gathers (CIP). If the depth at which an event is imaged is consistent across all offsets then a correct migration is judged to have been performed. Typically with real data, events slope up or down across these gathers (indicating a spatially consistent error in the velocity model) or trace a more complex path.

The present invention determines a set of dynamic shifts, varying both with offset and depth, that cause the events in a CIP gather to become flat and, hence, yield the sharpest possible stack. The present invention derives a strictly empirical correction. Any deviation of events from horizontal in the original CIP gather is treated as noise and no reference to velocities of any kind is made.

The shifts determined from selected CIP's are interpolated and applied to the entire depth data set before stacking.

The method of the present invention sorts the results of common offset depth migration into common image point gathers. From these, a subset of CIP gathers are selected for analysis. This method produces a set of shifts which, when applied, will remove the residual moveouts between traces and produce truly flat event images for stacking. These dynamic shifts vary with both offset and depth and can be interpolated between the selected CIP's. This yields corrections which can be applied to sharpen the stacked image of all CIP gathers in the line.

Each CIP trace is separated vertically into, for example, ten or more windows, each of which centers on a strong event. These events may be selected manually by the user or automatically. These windows overlap and are tapered at their ends, so that when added together, no sharp boundary occurs at their edges.

For each window, all the offsets of the CIP gather are summed to produce a brute stack trace to be used as an anchor. All offsets are cross-correlated to the anchor to determine how much each trace should be shifted to sum most constructively with the anchor. A limit is set on the shift, for example, twenty meters, so that multiples, which typically have larger residual moveouts, are not mistakenly aligned. These shifts are recorded for each depth window and each offset of each gather and interpolated for applying to the whole line.

DESCRIPTION OF THE PREFERRED EMBODIMENT

When seismic data is sorted into common offset panels, each offset can be processed as if it were an individual seismic section. Common offset depth migration converts each offset of time data into a common offset depth section. Each of these images represent the same subsurface structure. With a perfect velocity model, all offset sections will yield identical images. For real seismic data, it is normally impossible to obtain a perfect velocity model and the migrated offset sections are not identical.

Figure 3:
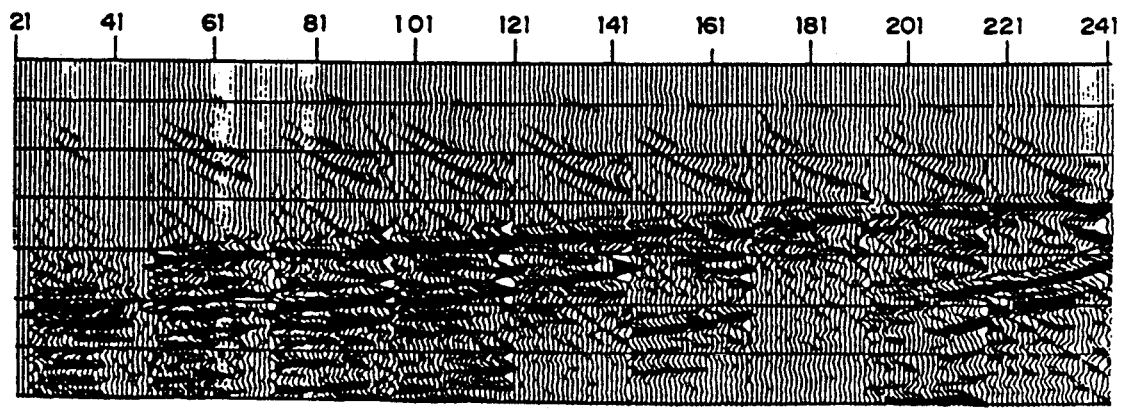
FIG. 3 is a common image point display wherein the velocity above the reflector is too low.
Figure 4:
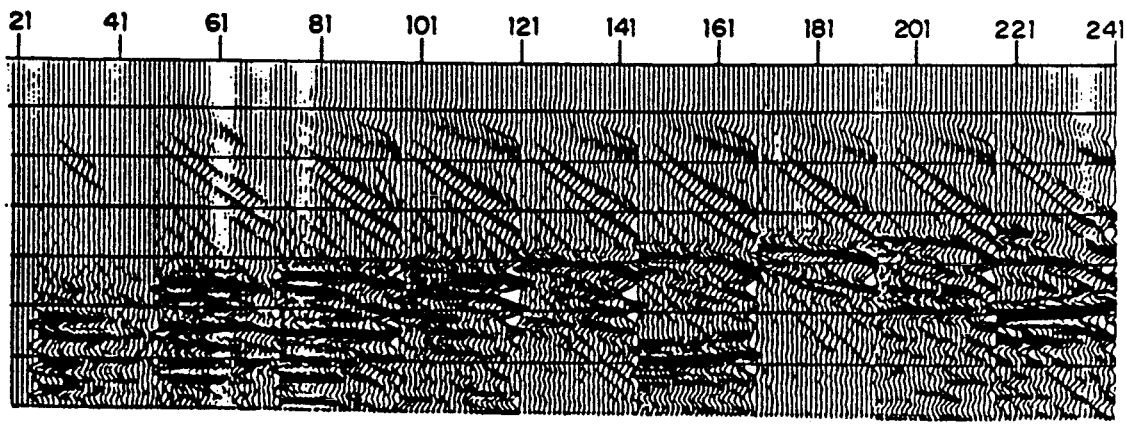
FIG. 4 is a common image point display wherein the velocity above the reflector is too high.

When these common offset depth sections are sorted into common image point gathers often referred to as Post Migration Parts (PMP's), differences in the images with offset can be readily seen. There are three gathers displayed in FIGS. 2-4. Near offset traces are to the left. A flat event indicates that the reflector was depth migrated to the same depth on each offset panel, and hence the velocity model used in the migration is correct. If the imaged event appears too deep at far offsets, it is under-migrated, and the velocity is too fast. If the imaged event appears too shallow at far offsets, it is overmigrated, and the velocity is too slow. Laterally varying velocity errors produce more complex residual moveouts (see FIG. 2).

The standard pre-stack depth migration process will stack traces as they are imaged, and the CIP gathers are not available for further analysis. This result is equivalent to a brute stack. When the model is incorrect, the residual depth moveouts can be large, resulting in a poor stack. This is one reason why standard pre-stack depth migration is so sensitive to the quality of the velocity model. A common offset depth migration program may be altered to save the imaged data before it is stacked in a set of common offset depth images. These, once sorted to CIP gathers, can then be treated with techniques similar to those used in pre-stack time processing to correct for any residual depth moveout. This processing sequence provides a fine-tuned, moveout free set of CIP gathers which produces an optimally stacked image section.

Figure 2:
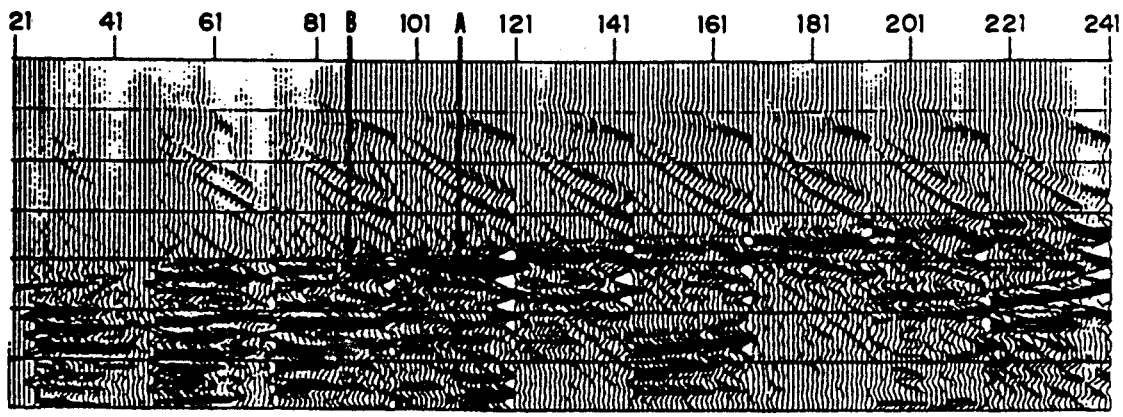
FIG. 2 is a common image point display wherein the velocity above the reflector is correct.

Prior Art has described a procedure for removing hyperbolic residual moveouts from common image point gathers. FIG. 2 shows such an event (A). FIG. 2 also shows a second event (B) with non-hyperbolic residual moveout. These residuals cannot be removed by using prior art methods.

The present invention provides a new method which can handle hyperbolic as well as non-hyperbolic events with arbitrary depth displacement between traces.

Figure 1:
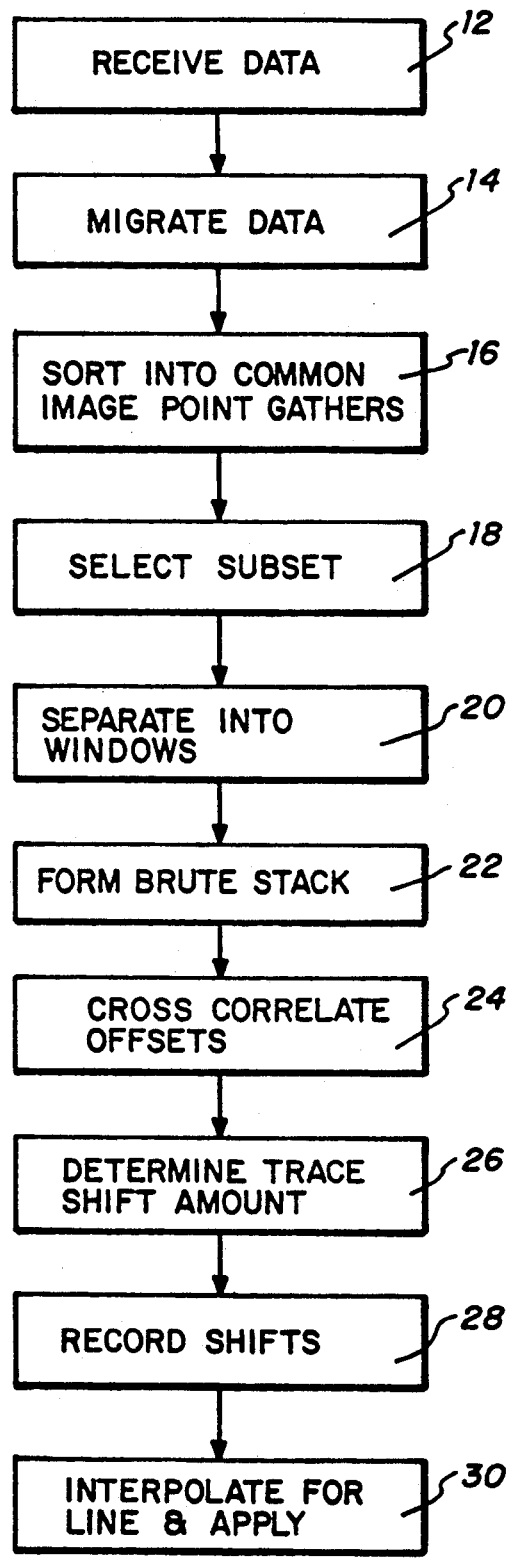
FIG. 1 is a flow chart of the method of the present invention illustrated in block form.

Referring now to FIG. 1, a flow chart of the present invention is illustrated in block form. At block 12 seismic data is received. This data may take any form currently in use in the art. At block 14 this data is common offset depth migrated. In practicing the present invention blocks 12 and 14 may be combined and migrated data may be received initially.

At block 16 the results of common offset depth migration are sorted into common image point (CIP) gathers. From these, a subset of CIP gathers are selected for analysis at block 18. The method of the present invention produces a set of shifts, varying with both depth and offset, which when applied will remove the residual moveouts and produce truly flat event images for stacking. These dynamic shifts can be interpolated between the selected CIP's. This yields corrections which can be applied to sharpen the stack of all CIP's in the line.

At block 20, each trace within each gather is separated vertically into windows, each of which centers on a strong event which may be picked by the user. In the preferred embodiment, approximately ten windows are selected. However, it is to be noted that any number of windows may be selected within reason. These windows overlap and are tapered at their ends, so that when added together, no sharp boundary occurs at their edges.

For each window, all the offsets of the CIP gather are summed to produce a brute stack trace to be used as an anchor at block 22. All offsets are cross-correlated at block 24 to the anchor. At block 26 how much each trace should be shifted to sum most constructively with the anchor is determined. A limit is set on the shift, for example twenty meters, so that multiples, which have larger residual moveouts, are not mistakenly aligned.

At block 28 these shifts are recorded for each window of each offset trace. At block 30 the recorded dynamic shifts are interpolated for applying to the whole line. To do this, it is best that every window contains a distinct event. This method performs an empirical correction, treating the residual moveout, which may be real, as noise in the stack.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for removing non-hyperbolic residual moveout comprising the steps of:
    receiving seismic data;
    common offset depth migrating said seismic data;
    sorting said common offset depth migrated data into common image point gathers;
    selecting a subset of common image point gathers;
    separating each common image point gather vertically into windows;
    summing all the offsets of the depth image for each window to produce a brute stack trace to be used as an anchor;
    cross-correlating all offsets to the anchor;
    determining how much each trace should be shifted to sum most constructively with said anchor;
    recording said shifts for each window and offset; and
    interpolating said shifts for applying to a whole seismic line wherein said non-hyperbolic residual moveout is removed.

2. The method according to claim 1 wherein said separating step includes the step of:
    selecting a predetermined number of windows.

3. The method according to claim 1 wherein said determining step includes the step of:
    limiting said shift to a preselected distance.

4. An apparatus for removing non-hyperbolic residual moveout comprising:
    accepting means for receiving seismic data;
    migration means for common offset depth migrating said seismic data;
    means for sorting said common offset depth migrated data into common image point gathers;
    means for selecting a subset of common image point gathers;
    means for separating each image point gather vertically into windows;
    combining means for summing all the offsets of the depth image for each window to produce a brute stack trace to be used as an anchor;
    means for cross-correlating all offsets to the anchor;
    determining means determining how much each trace should be shifted to sum most constructively with said anchor;
    means for recording said shifts for each window of each image point gather; and
    means for interpolating said shifts for apply to a whole seismic line wherein said non-hyperbolic residual moveout is removed.

5. The apparatus according to claim 4 wherein said means for separating includes:

means for selecting a predetermined number of windows.

6. The apparatus according to claim 5 wherein said predetermined number is ten.

7. The apparatus according to claim 4 wherein said determining step includes the step of:
   limiting said shift to a preselected distance.

8. The apparatus according to claim 7 wherein said preselected distance is twenty meters.

* * * * *